US008626658B1

(12) United States Patent
Kapulkin et al.

(10) Patent No.: US 8,626,658 B1
(45) Date of Patent: Jan. 7, 2014

(54) METHODS, SYSTEMS AND APPARATUS FOR PROVIDING A DYNAMIC ACCOUNT LIST IN AN ONLINE FINANCIAL SERVICES SYSTEM (75) Inventors: Yuri Kapulkin, Sunnyvale, CA (US); Mark Robert Shulman, Mountain View, CA (US); Thomas E. Hurlbutt, Mountain View, CA (US); David McIelland, Union City, CA (US); Albert J. Ko, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 235 days.

(21) Appl. No.: 12/845,523

(22) Filed: Jul. 28, 2010

(51) Int. Cl.
*G06Q 40/00* (2012.01)
(52) U.S. Cl.
USPC .......................................................... 705/42
(58) Field of Classification Search
USPC ...................................................... 705/35–45
See application file for complete search history.

(56) References Cited

U.S. PATENT DOCUMENTS

| | | | | |
|---|---|---|---|---|
| 7,797,207 | B1 * | 9/2010 | Dilip et al. | 705/35 |
| 7,853,493 | B2 * | 12/2010 | DeBie et al. | 705/30 |
| 2003/0229585 | A1 * | 12/2003 | Butler | 705/39 |
| 2004/0088232 | A1 * | 5/2004 | Minnis, Jr. | 705/30 |
| 2007/0094126 | A1 * | 4/2007 | Bufford | 705/38 |
| 2007/0282728 | A1 * | 12/2007 | Carpenter et al. | 705/36 R |
| 2009/0271211 | A1 * | 10/2009 | Hammad | 705/1 |
| 2010/0017325 | A1 * | 1/2010 | Scherpa et al. | 705/39 |
| 2011/0099101 | A1 * | 4/2011 | Emery et al. | 705/38 |

OTHER PUBLICATIONS

Walker, Leslie, Personal Finance Goes Portal; Web-Based Tools for Managing Savings and Spending are Boosting Competition, Cutting Fees: [Final Edition], The Washington Post [Washington, D.C.], Sep. 24, 2000, pp. 1-7.*
Kim, Jane, J, "Young Money: Managing Your Money in Public View; A Slew of New Web Sites are Trying to Attract Young People by Combining Social Networking with Personal Finance", Wall Street Journal, Eastern Edition [New York, N.Y.], Jun. 14, 2007, pp. 1-3.*
Tedeschi, Bob, Your Financial Situtation, in the Palm of Your Hand: [Business/Personal Tech], New York Times, Late Edition (East Coast) [New York, N.Y.], Apr. 15, 2010, pp. 1-3.*
Higgins, Jim, "Centsible Choices Money 2000 zips in its own world": [All Edition], Milwaukee Journal Sentinel [Milwaukee, Wis], Nov. 16, 1999, pp. 1-2.*
Connelly, Eileen, AJ, "Banks merging financial data online Web site enhancements spurred by services that track multiple accounts", Journal-Gazette [Ft. Wayne, Ind], Jan. 31, 2010, pp. 1-3.*

* cited by examiner

*Primary Examiner* — Mohammad Z Shaikh
(74) *Attorney, Agent, or Firm* — Vista IP Law Group LLP (57) ABSTRACT

Systems, methods and articles of manufacture for displaying a list of a plurality of accounts of a user in an online financial services website are provided. A relevance index is determined for each account accessible by the user at the website which is based upon a number of account factors related to the expected level of interest for each account. The website displays a list of the accounts in an order from of relevance based upon the relevance index for each account so that the accounts of most interest to the user are displayed at the top of the list.

17 Claims, 4 Drawing Sheets

METHODS, SYSTEMS AND APPARATUS FOR PROVIDING A DYNAMIC ACCOUNT LIST IN AN ONLINE FINANCIAL SERVICES SYSTEM

BACKGROUND

The invention relates to methods, systems and apparatus for financial management software applications; and more particularly, to new methods, systems and apparatus for providing a dynamic account listing in an online financial services system.

Most retail financial institutions, such as banks, investment companies, stock brokers, credit card issuers, and insurance companies, offer online services to their customers/clients (collectively referred to as clients or users) which are accessible by the user through a website provided by the financial institution. The online services range from basic non-transactional features such as reviewing transactions, account balance and statement information, to transactional features such as account to account fund transfers, wire transfers, loan applications, new account applications, bill payment and investment purchase and sale. The online services provided by each financial institution vary from institution to institution.

These online services provide a significant convenience to the user, and are designed to be fairly easy to use. For example, most online banking services websites have online bill pay systems which allow a user to pay bills from various payees through the website provided by the financial institution (or a third party website service provider contracted by the financial institution). Many credit card websites also have online bill pay systems which allow a user to pay bills using the user's credit card account. The online bill pay systems allow a user to view, review, and/or make payments and pay bills to various payees from the user's financial account at the financial institution.

Some of these online financial services websites also allow a user to access account information and perform transactions for multiple accounts. For example, an online banking service may allow a user to link multiple accounts to a single online banking service website. In this way, the user can access account information and perform transactions for each of the linked accounts. Such an online banking service website may allow a user to transfer funds between the linked accounts, make payments to and from the linked accounts, review electronic bills, pay bills from the linked accounts, and other possible services.

Some online financial services websites provide personal financial management applications. Personal financial management applications are useful tools for managing personal finances is a personal financial management software application. Personal finance software applications (including online applications) allow a user to organize and track their personal finances. As examples, Quicken® is a desktop and online personal finance software application, available from Intuit Inc., Mountain View, Calif., and Mint® is an online application (See the website "mint.com").

Some online financial services websites include a personal financial management application, in addition to the other online services such as account review and performing account transactions. The personal financial management application may be separate or integrated with the other functionality of the financial services website. An example of an online personal financial management system provided as an online banking service is FinanceWorks™ provided by Intuit Financial Services, a unit of Intuit Inc., of Mountain View, Calif. FinanceWorks™ allows a user to download financial data from numerous financial institutions from a single website, and then analyzes and organizes the data and provides the financial management functions described above for personal finance applications. Such personal finance applications can perform financial management functions such as managing and paying bills, tracking and managing investments, performing budgeting tasks, viewing and printing summaries and reports, preparing and printing expense reports, writing checks, paying bills with checks or online. The applications can download banking, financial and billing data directly from banks, companies, and financial institutions through a secure internet connection. The applications can create a financial profile of the user in which users can review their financial "picture," review spending and saving habits, create budgets and spending and saving goals, calculate gains and losses on investments, and have reminders set to emphasize dates on which bills or other obligations are to be paid.

Current financial services websites which are enabled to access and manage multiple accounts of a user provide a list of accounts for the user to review and to choose from for reviewing and/or performing some activity. Presently, the account lists are only static and typically list the accounts in order by account number, alphabetically, or grouped by account type (such as credit card accounts, bank accounts, investment accounts, etc.). Thus, the account list displayed to the user generally has no relationship to which accounts are likely to be of most interest to the user, or most likely for the user to access and perform some activity.

While these online personal finance management services and financial services websites provide many conveniences, there are enhancements that can be made to improve them.

SUMMARY

The present invention is directed to methods, systems and apparatus for determining and displaying the accounts of a user on an online financial services website in order of relevance, with the most relevant accounts being displayed more prominently, such as at the top of a listing. In this way, the accounts more likely to be accessed and utilized by the user will be at the more quickly and easily accessible.

One embodiment of the invention is directed to a method for displaying a list of a plurality of accounts of a user in an online financial services website. The method comprises a step of determining a relevance index for each account that is accessible by the user at the online financial services website. The relevance index for each account is related to the expected level of interest of each account to the user, and is based upon a plurality of corresponding account factors. For instance, the account factors may include the amount of transactional activity, the amount of user interaction, and the magnitude of account activity, corresponding to each account.

The method displays to the user a list of the plurality of accounts in an order from most relevant to least relevant based upon the relevance index for each account. Depending on how the relevance index is determined, the order might be from the highest relevance index to the lowest relevance index, or vice versa, but in any case, from most relevant to least relevant. Therefore, as used herein, relative terms such as "higher," "highest," "lower," "lowest" with respect to "relevance index" refers to the relative relevance, regardless of the actual numerical or other value determined for the "relevance index." For example, stating that a first account has a higher relevance index than a second account, means that the relevance index of the first account indicates it is more relevant, or of greater interest, to the user than the second account. The list is displayed on the user's internet connected device, such as a personal computer, personal cellular telephone, a personal digital assistant (PDA), a smartphone, or other suitable internet connected communications device.

In another aspect of the method, the displayed list may include only some of the accounts having the highest relevance index of all of the accounts. As an example, the method may display only top five or top ten most relevant accounts based on the respective relevance indexes for each account. Alternatively, a number of the most relevant accounts may be displayed more prominently than the remaining less relevant accounts, such as display in bold text, larger text, and/or a different color text.

In another embodiment of the present invention, a method for displaying a list of a plurality of accounts of a user in an online financial services website comprises determining a plurality of account factors corresponding to each account. For instance, the method may determine the corresponding amount of transactional activity for each account, the corresponding amount of user interaction with each account, and the corresponding magnitude of account activity for each account, during a period of time, such as over the last thirty days, or three months, as examples. The method then determines a relevance index for each account based on each of the account factors. The relevance index may be based on weighted combination of the account factors, such that certain account factors are given greater weight than other account factors. For example, the amount of user interaction with an account may be considered to be a stronger indicator of account relevance to user than the amount of transaction activity, and therefore the amount of user interaction may be given greater weight in determining the relevance index of each account. Then, similar to the embodiment described above, the method displays to the user a list of the accounts in an order from highest relevance index to lowest relevance index.

In another aspect of the methods of the present invention, the displayed order may be modified by a user selected override to display certain accounts at specified locations within the list. For instance, the user may set an override to always display a first account at the top of the list, and a second account at the bottom of the list. Then, the remaining accounts are displayed in order from highest relevance index to lowest relevance index.

Another embodiment of the present invention is directed to a system for implementing any of the methods described herein for displaying a list of a plurality of accounts of a user in an online financial services website. The system comprises one or more computers, data storage servers, and a website server which is in communication with the internet. The computers, servers and website server are operably connected via a communication network. The system is also in communication with other financial institutions through a network, typically comprising a combination of private networks and secure internet connections, in order to communicate and access data for a user's accounts. The website server is configured to perform any of the method embodiments described herein, for example, the following steps: (i) determining a relevance index for each account based upon a plurality of account factors which is related to the level of expected interest of each account to the user; and (b) displaying to the user a list of the accounts in an order from most relevant to least relevant based upon the relevance index for each account.

The website server may be a collection of servers and computers which accomplish the method for displaying a list of a plurality of accounts of a user, of which at least one of the servers is connected to the internet. Therefore, the website server is accessible by the user through the internet.

Another embodiment is directed to an article of manufacture comprising a computer program carrier readable by a computer and embodying instructions executable by the computer to program a computer to implement any of the methods described herein for displaying a list of a plurality of accounts of a user in an online financial services website. As an example, the instructions may program a computer to perform the following steps: (i) determining a relevance index for each account based upon a plurality of account factors which is related to the level of expected interest of each account to the user; and (b) displaying to the user a list of the accounts in an order from most relevant to least relevant based upon the relevance index for each account.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Figure 1:
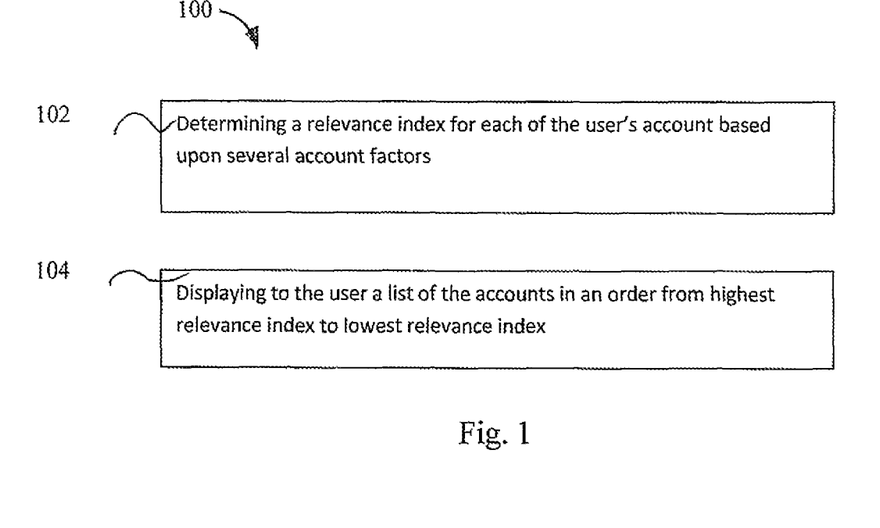
FIG. 1 is a flow chart of a method for displaying a list of a plurality of accounts of a user in an online financial services website according to one embodiment of the present invention.

Embodiments of the present invention are directed to systems, methods and apparatus for displaying a list of a plurality of accounts of a user in an online financial services website. The list of accounts is prioritized based on a determination of the relevance of each account, with the most relevant accounts being listed first, typically at the top of the list. Referring to FIG. 1, one embodiment of a user account list display method 100 according to the present invention is shown. The method 100 is utilized within an online financial services system which includes an online financial services website. The online financial services system may be for any type of financial services website that has the capability to access and manage multiple accounts of the user, including without limitation, the online services provided by banks, investment companies, stock brokers, credit card issuers, insurance companies, financial management application service providers, and the like.

As described above, the method is applicable to an online financial services website having the capability to access multiple accounts of the user. For example, the website may be a bank website for the user's bank, where the user has multiple accounts at the bank such as a checking account, a savings account, and an investment account. The bank website may also have the capability to access and manage outside accounts of the user that are not user accounts at the bank. For instance, the bank's online financial services may be able to link any type of account such that it can access the account information and/or perform transactions related to the account. As examples, the bank's online financial services may link to any and all of the user's accounts, including merchant/retail credit accounts such as retail stores, gas stations, and the like, credit card accounts such as American Express, Visa, Mastercard and the like, brokerage, investment and retirement accounts, accounts at other banks, medical accounts, insurance accounts, and any other financial accounts. An online financial services system can access outside financial accounts in any suitable manner. As some examples, the online financial services system may obtain the credentials of the user for accessing financial data or the user's accounts from a plurality of outside financial institutions. The access may be through a website for the financial institution or a private network. The credentials typically include usernames and passwords. Then, the online financial services system electronically accesses the financial data for the user's outside accounts through a network than can access the online accounts. The online financial services system automatically enters the client's credentials and then obtains the financial data from the servers of the financial institutions. The financial services system may need to be programmed specifically for each financial institution to properly navigate the online accounts in order to obtain the desired financial data. The financial data for outside accounts may also be obtained by accessing financial data from the servers and/or storage devices of financial institutions through a network connection or by transferring storage media such as CDs, tape drives, hard disks, or the like.

Accordingly, the financial services website allows the user to review and manage multiple accounts of the user at a single website. The financial services website displays a list of the multiple accounts from which the user can select to review and/or perform transactions.

As described in more detail below, the method 100 will typically be implemented on a computer system comprising one or more computers, storage devices and a website server utilizing a software program configured to carry out the steps of the method. The website server may include multiple computer servers. The online financial services website is then accessible to a user via an internet-connected device, such as a personal computer, cellular phone, PDA, or smartphone, for example. The interface for the server based application can be an internet browser or specialized software residing on the local computer. Furthermore, the software program may be a stand-alone application, or it may be integrated into another software application. For instance, the software program may be integrated into a personal finance application such as FinanceWorks™ available from Digital Insight, a unit of Intuit Inc., of Mountain View, Calif., Quicken® online, available from Intuit Inc., Mountain View, Calif., or Mint®, available at the website MINT.COM.

The method 100 comprises a step 102 for determining a relevance index for each of the user's accounts which are available on the financial services website. As described above, the relevance index is related to the expected level of interest of each account to the user, and is based upon a plurality of corresponding account factors which are related to the level of expected interest of each account. As described in more detail below, the account factors may include such factors as the amount of transactional activity and the amount of user interaction, corresponding to each account. The relevance index may be a numerical value, a ranking level (such as A, B, C . . . ), or other index such that the relevance indexes for each account can be ranked relative to each other. Also, as defined above, an account with a higher relevance index is predicted to be of greater interest to the user than an account with a lower relevance index, and vice versa.

Then, at step 104, the method 100 displays to the user a list of the accounts in order from the highest relevance index to the lowest relevance index. Thus, the method 100 lists the user's accounts predicted to be of highest interest to the user at the top, front or beginning of the list, and the accounts of less interest are displayed below, behind, or after the accounts of higher interest. As a result, the method 100 provides a dynamic account listing that keeps the most relevant accounts of the user toward at the forefront of the account list where they are most easily accessed by the user. And it remains, if the user wants to access one of the lower relevance accounts, they can still access those accounts from the account list. The list may be displayed on the user's internet connected device used to access the online financial services website, such as a personal computer (PC), a cellular telephone, a personal digital assistant (PDA), a smartphone, or other suitable internet connected communications device.

Figure 2:
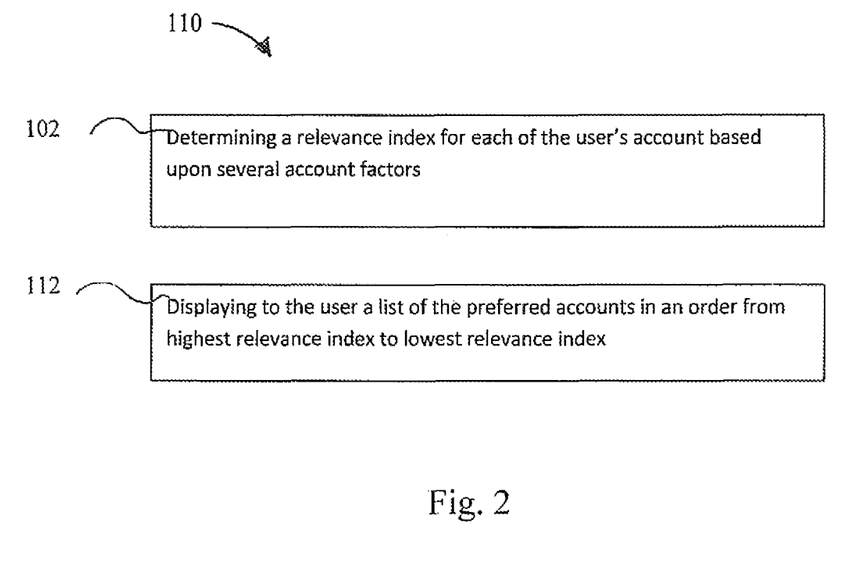
FIG. 2 is a flow chart of a method for displaying a list of a plurality of accounts of a user in an online financial services website according to another embodiment of the present invention.

Turning now to FIG. 2, another embodiment of a user account list display method 110 according to the present invention is shown. Method 110 is identical to method 100 described above, except that the displayed list does not include all of the multiple accounts which are accessible from the online financial services website, but instead only displays a specified number of the accounts having the highest relevance index. For example, at step 112, the method 110 may display only the "preferred accounts" comprising those accounts meeting a selection criteria, such as the highest 5, 10, or 20 accounts, or the highest 10%, or 50%, based on relevance indexes. The displayed list may include a button or selection for expanding the list to include all of the accounts, in case the user wants to see or access accounts outside the favorite. The method 110 may allow the user to choose the criteria for determining the preferred accounts, such as choosing between the highest 5, 10, or 20 accounts, or the highest 10%, or 50%, based on relevance indexes.

Alternatively, at step 112, the preferred accounts may be displayed more prominently than the non-preferred accounts, while still displaying the non-preferred accounts in the list. For instance, the preferred accounts may be displayed in bold text, larger text, a different colored text, or with some other highlighting effect to distinguish the preferred accounts from the non-preferred accounts. The preferred accounts may still be determined as described above.

Figure 3:
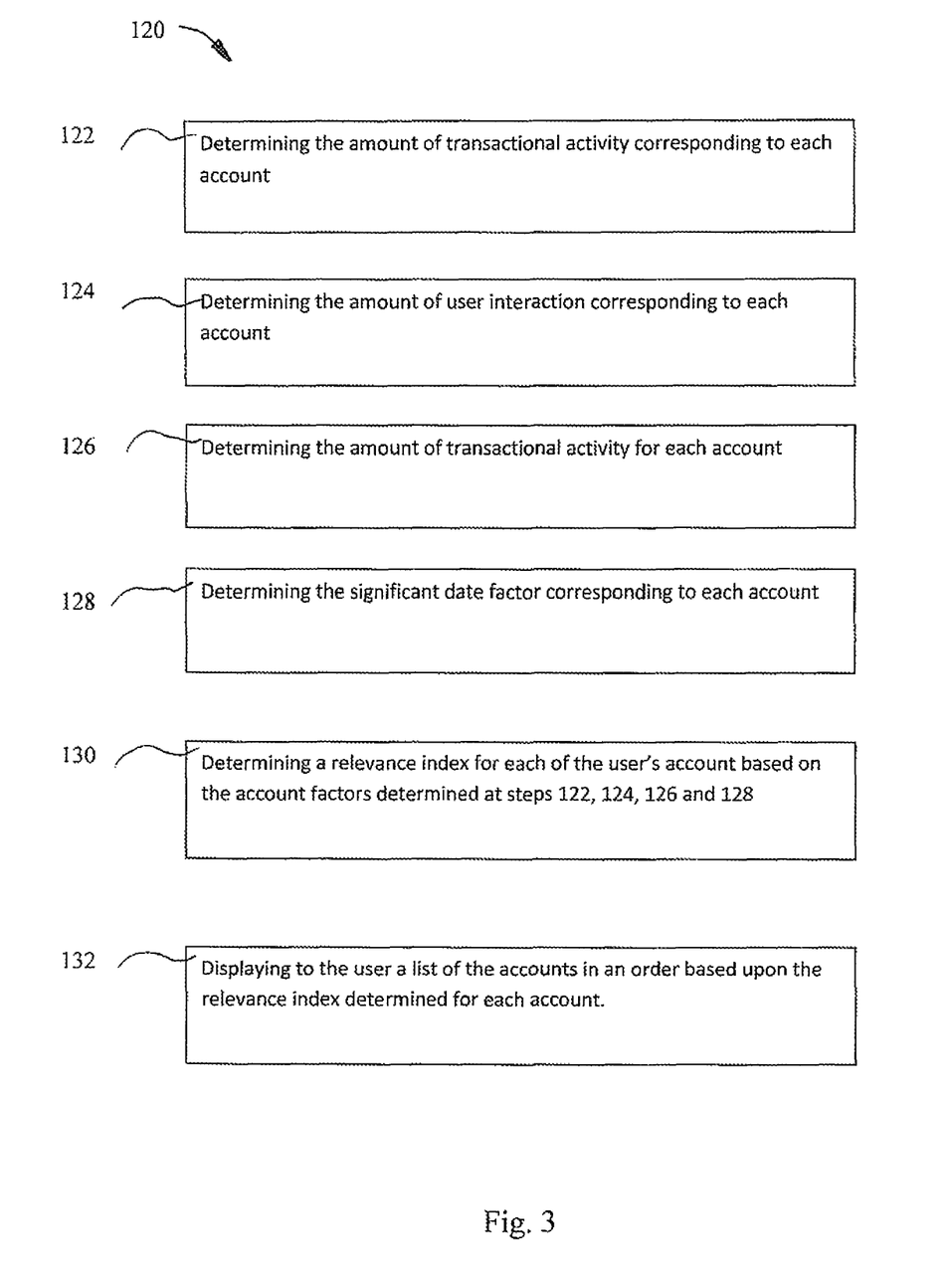
FIG. 3 is a flow chart of a method for displaying a list of a plurality of accounts of a user in an online financial services website according to still another embodiment of the present invention.

Referring now to FIG. 3, yet another embodiment of a user account list display method 120 according to the present invention is shown. The method 120 comprises steps 122, 124, 126 and 128 for determining several account factors corresponding to each account of the user which is available to the user on the financial services website. The account factors are chosen because they are known, or assumed, to be indicative of the importance, interest, and/or relevance of an account to the user. In this exemplary embodiment, the account factors include the amount of transactional activity corresponding to each account (step 122); the amount of user interaction with each account (step 124); the magnitude of account activity (step 126); and a significant date factor (step 128). It should be understood that these account factors are examples, and many other account factors may be utilized according to the present invention.

As described above, the online financial services system has access to the account data for each of the multiple accounts available to the user on the online financial services website. The online financial services system uses this account data to determine the various account factors. The amount of transactional activity, amount of interaction and magnitude of account activity will typically be determined over some period of time. For example, the period of time may be the last 30 days, 60 days, one month, two months, 3 months or other suitable period of time. The period of time used for determining each of the account factors may be the same, or they may be different.

Accordingly, at step 122, the method 120 determines the amount of transactional activity corresponding to each account. For instance, each financial transaction for a first account may be considered a transaction. The number of transactions are counted and/or weighted for each account over a period of time, which is then utilized to determine the amount of transactional activity. As one example, a user's credit card account may have 5 credit card charges, and 2 payments during the period of time. This may convert to 7 transactions over the period of time. As another example, a user's checking account may have 3 checks, 3 deposits, 2 ATM withdrawals, and 2 electronic payments, which may then convert to 10 transactions over the period of time. Certain transactions may be more heavily weighted than other transactions. The weighting of transactions may be based upon the size of a transaction, the regularity of the transaction, or other factors, such that the amount of transactional activity may not equate to the number of transactions, but may be modified by a weighting factor. Therefore, the step 122 for determining the amount of transactional activity may take into account the weighting of transactions.

At step 124, the method 120 determines the amount of user interaction corresponding to each account. For instance, interaction with an account may include:
   a. reviewing an account online;
   b. placing alerts on an account;
   c. requests from the user for account details, such as SMS text request or online requests;
   d. recent alerts placed on an account (e.g. balance alerts, high transaction alerts, over-credit line alerts, overdrawn account alerts).

The amount of user interaction with each account is determined over a period of time. Similar to the transaction activity described above, the different types of interaction with an account may have different weighting in determining the amount of user interaction with an account. For instance, more recent alerts may have greater weighting than older alerts, over-credit line or overdrawn account alerts may are probably more important than a simple online review of the account, and therefore may be given greater weight in determining the amount of user interaction. Therefore, the step 124 for determining the amount of user interaction with an account may take into account the different weighting of different types of interactions.

At step 126, the method 120 determines the magnitude of account activity for each account. For example, the magnitude of the activity in a bank account may include the total dollar amount of checks, deposits, withdrawals and other transactions, over a period of time. The step 126 may determine the magnitude based on a percentage of the activity to the overall size of the account. For instance, if the amount of transactions in a bank account over a period of time is $10,000, but the account balance is $10 million, the "magnitude" of account activity may take into account that the amount of transactions is relatively small compared to the total balance. As another example, if a stock account goes significantly up or down relative to the total value of the stock account, then this would be taken into account in determining the magnitude of account activity. The weighting of transactions may be based upon the size of a transaction, the regularity of the transaction, or other factors, such that the amount of transactional activity may not equate to the number of transactions, but may be modified by a weighting factor. Therefore, the step 126 for determining the magnitude account activity may take into account the weighting of account activity based on the absolute value of the account activity and the value of account activity relative to the size of the account.

At step 128, the method 120 determines a significant date factor based upon upcoming significant dates corresponding to each account, such as payment due dates, investment maturity dates, or other important account dates. Important account dates that are more nearer may be weighted higher than dates further in the future. Certain account deadlines may also be given greater weighting, such as mortgage payment deadlines, loan payments, or payments having penalties for late payment. Therefore, the step 128 for determining a significant date factor may take into account the weighting of the significant dates for certain accounts and payments.

At step 130, the method 120 determines a relevance index for each account based on each of the account factors determined at steps 122 through 128. The determination of a relevance index for each account may comprise a weighted combination of each of the account factors determined at steps 122 through 128, or the steps 122 through 128 can perform the proper weighting for combining the account factors into a relevance index at step 130. Similar to step 102 described above, the relevance index may be a numerical value, a ranking level (such as A, B, C . . . ), or other index such that the relevance indexes for each account can be ranked relative to each other.

Step 132 for displaying to the user a list of the accounts in order based upon the relevance index for each account may be the same as steps 104 and/or 112 described above, and the description of steps 104 and 112 apply equally to step 132.

Figure 4:
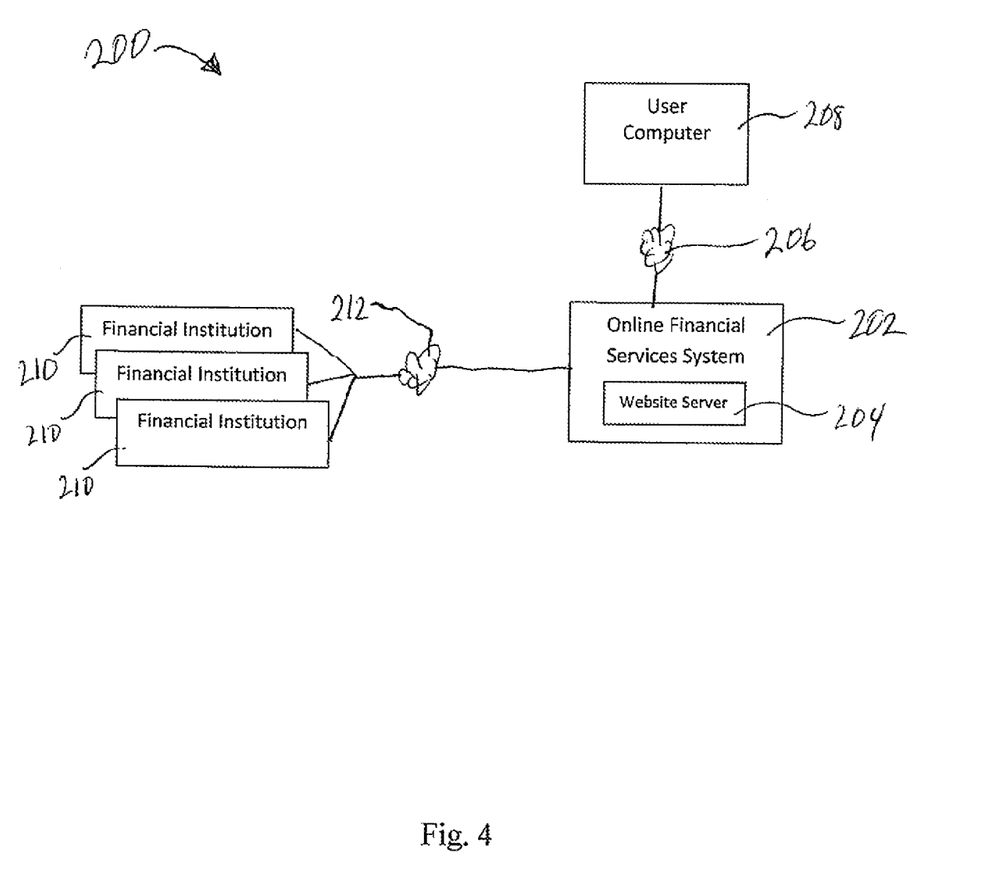
FIG. 4 illustrates a system for displaying a list of a plurality of accounts of a user in an online financial services website, according to still another embodiment of the present invention.

Referring now to FIG. 4, a non-limiting example of a system 200 that may be used to implement any of the methods 100, 110 and 120, as shown in FIGS. 1, 2, and 3, as well as other method embodiments and aspects that may be described herein, is depicted. The system 200 comprises an online financial services system 202 comprising one or more computers, data storage servers and a website server 204 which is in communication with the internet 206. The online financial services system 202 and website server 204 are programmed to perform the steps of any of the methods 100, 110 and 120, as well as any other method embodiments described herein. Accordingly, the website server 204 includes pages, files and programming to interact with a user computer 208 through the internet 206. The user 208 accesses and utilizes the online financial services system 202 through a computer connected to the internet 206 using a web browser. The website server 204 may be a collection of servers in operable communication with each other in which at least one of the servers is connected to the internet 206. The financial services system 202 also has access to a plurality of financial institution servers 210 in order to access user account data for a plurality of user accounts. The financial services system 202 may access the user account data through any suitable communication network 212, including a proprietary network, LAN, WAN, cellular network, wireless network, the internet and/or other suitable network. The financial institution servers 210 may also comprise one or multiple servers. The website server 204 may be operated by a financial institution or a third party host. One example of a third party host that provides website servers for providing online banking services for financial institutions and their customers is Digital Insight.

As described herein, the online financial services system 202 may be separate from any other online banking services solution, or it may be integrated as part of an online services solution of a financial institution which has various other online services, such as bill payment and financial management services.

Accordingly, a system 200 is provided which can provide a dynamic user account listing in an online financial services website according to any of the methods described herein.

The methods 100, 110 and 120, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the methods 100, 110 and 120, as well as any other method embodiments and aspects described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in FIGS. 1 and 2 are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for displaying a list of a plurality of accounts that a customer has at one or more financial institutions, in an online financial services website, the method being performed by a computerized financial services system, the method comprising the following steps:
   the computerized financial services system determining an amount of transactional activity corresponding to each account;
   the computerized financial services system determining an amount of user interaction corresponding to each account;
   the computerized financial services system determining a magnitude of account activity corresponding to each account, wherein the magnitude of account activity is selected from the group consisting of the total dollar amount of checks, the total dollar amount of deposits, the total dollar amount of withdrawals, the total dollar amount of other transactions, and a combination of the foregoing, over a period of time;
   the computerized financial services system determining a relevance index for each account based on the amount of transactional activity, amount of user interaction and magnitude of account activity for each account;
   the computerized financial services system transmitting to the customer a list of the accounts for displaying the list of accounts to the consumer in an order from most relevant to least relevant based upon the relevance index for each account.

2. The method of claim 1, wherein said step of transmitting to the customer a list of the accounts comprises only displaying a predetermined number of accounts having the highest relevance index.

3. The method of claim 1, wherein the customer interaction with an account includes the customer reviews of the account information via the website, alerts placed on the account and requests for balance or transaction information via any account access method mode.

4. The method of claim 3, wherein alerts that are more recent in time are weighted heavier than older alerts in calculating the relevance index of an account.

5. The method of claim 1, wherein the magnitude of account activity of an account includes a percentage change of the account balance over a period of time.

6. The method of claim 1, wherein the steps of determining an amount of transactional activity corresponding to each account, determining an amount of customer interaction corresponding to each account, and determining a magnitude of account activity corresponding to each account are determined for a period of time.

7. The method of claim 6, wherein the period of time is selected from the group consisting of: 30 days, 60 days, 90 days, one month, two months and three months.

8. The method of claim 7, wherein said step of the computerized financial services system determining a relevance index for each account comprises:
   the computerized financial services system determining a significant date factor for each account which is based upon upcoming due dates for each account.

9. The method of claim 8, wherein the customer interaction with an account includes the customer reviews of the account information via the website, alerts placed on the account and requests for balance or transaction information via any account access method mode.

10. The method of claim 9, wherein alerts that are more recent in time are weighted heavier than older alerts in calculating the interest index of the account.

11. The method of claim 8, wherein the magnitude of account activity of an account includes the percentage change of the account balance over a period of time.

12. The method of claim 8, wherein the steps of determining an amount of transactional activity corresponding to each account, determining an amount of customer interaction corresponding to each account, and determining a magnitude of account activity corresponding to each account are determined for a period of time.

13. The method of claim 12, wherein the period of time is selected from the group consisting of: 30 days, 60 days, 90 days, one month, two months and three months.

14. The method of claim 1, further comprising the step of determining a significant date factor for each account which is based upon upcoming due dates for each account, and said step of determining a relevance index is also based on the significant date factor.

15. The method of claim 1, wherein the plurality of accounts includes respective accounts at a plurality of respective financial institutions.

16. A system for displaying a list of a plurality of accounts that a customer has at a one or more financial institutions, in an online financial services website, the system comprising:
- a website server comprising at least one processor hosting the website configured to perform the following steps:
- determining an amount of transactional activity corresponding to each account;
- determining an amount of customer interaction corresponding to each account;
- determining a magnitude of account activity corresponding to each account,
wherein the magnitude of account activity is selected from the group consisting of the total dollar amount of checks, the total dollar amount of deposits, the total dollar amount of withdrawals, the total dollar amount of other transactions, and a combination of the foregoing, over a period of time;
- determining a relevance index for each account based on the amount of transactional activity, amount of customer interaction and magnitude of account activity for each account;
- transmitting to the customer a list of the accounts for displaying list of accounts to the customer in an order from most relevant to least relevant based upon the relevance index for each account.

17. An article of manufacture comprising a non-transitory computer program carrier readable by a computer and embodying one or more instructions executable by the computer to perform method steps for displaying a list of a plurality of accounts that a customer has at one or more financial institutions, in an online financial services website, the method steps comprising:
- determining an amount of transactional activity corresponding to each account;
- determining an amount of customer interaction corresponding to each account;
- determining a magnitude of account activity corresponding to each account, wherein the magnitude of account activity is selected from the group consisting of the total dollar amount of checks, the total dollar amount of deposit, the total dollar amount of withdrawals, the total dollar amount of other transactions, and a combination of the foregoing, over a period of time;
- determining a relevance index for each account based on the amount of transactional activity, amount of customer interaction and magnitude of account activity for each account;
- transmitting to the customer a list of the accounts for displaying the list of accounts to the customer in an order from most relevant to least relevant based upon the relevance index for each account.

* * * * *